(12) United States Patent
Belliot

(10) Patent No.: US 7,935,423 B2
(45) Date of Patent: May 3, 2011

(54) GLAZING PROVIDED WITH A STACK OF THIN FILMS ACTING ON THE SUNLIGHT

(75) Inventor: Sylvain Belliot, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 476 days.

(21) Appl. No.: 11/996,757

(22) PCT Filed: Jul. 18, 2006

(86) PCT No.: PCT/FR2006/050727
§ 371 (c)(1),
(2), (4) Date: Feb. 14, 2008

(87) PCT Pub. No.: WO2007/028913
PCT Pub. Date: Mar. 15, 2007

(65) Prior Publication Data
US 2008/0226882 A1    Sep. 18, 2008

(30) Foreign Application Priority Data

Jul. 29, 2005  (FR) ...................... 05 52387

(51) Int. Cl.
*B32B 17/06* (2006.01)
(52) U.S. Cl. ........ 428/432; 428/472; 428/446; 428/698; 428/213; 428/216; 428/701; 428/704
(58) Field of Classification Search .................. None
See application file for complete search history.

(56) References Cited

U.S. PATENT DOCUMENTS

| | | | |
|---|---|---|---|
| 5,073,451 A | 12/1991 | Iida et al. | |
| 5,216,542 A | 6/1993 | Szczyrbowski et al. | |
| 7,452,603 B2 * | 11/2008 | Fleury et al. | 428/426 |
| 2002/0017452 A1 | 2/2002 | Zimmermann et al. | |
| 2002/0192473 A1 * | 12/2002 | Gentilhomme et al. | 428/432 |
| 2004/0214013 A1 | 10/2004 | Stachowiak et al. | |
| 2006/0165963 A1 | 7/2006 | Fleury et al. | |
| 2006/0201203 A1 | 9/2006 | Labrousse et al. | |
| 2006/0240266 A1 * | 10/2006 | Schicht et al. | 428/426 |
| 2006/0280951 A1 * | 12/2006 | Fleury et al. | 428/432 |

FOREIGN PATENT DOCUMENTS

| | | |
|---|---|---|
| EP | 0 530 676 | 3/1993 |
| EP | 1 148 037 | 10/2001 |
| EP | 1 300 374 | 4/2003 |
| FR | 2 799 005 | 3/2001 |
| FR | 2 841 894 | 1/2004 |
| FR | 2 857 885 | 1/2005 |
| JP | 05 294674 | 11/1993 |
| JP | 08 295539 | 11/1996 |
| JP | 09 255371 | 9/1997 |
| WO | 02/24971 | 3/2002 |
| WO | 2005 000578 | 1/2005 |
| WO | WO-2005028391 | * 3/2005 |

* cited by examiner

*Primary Examiner* — Ling Xu
(74) *Attorney, Agent, or Firm* — Oblon, Spivak, McClelland, Maier & Neustadt, L.L.P.

(57) ABSTRACT

The subject of the invention is a transparent substrate, especially a glass substrate, provided with a thin-film multilayer acting on solar radiation, the multilayer being deposited by magnetron sputtering, characterized in that it includes at least a lubricating film of high optical index n, this lubricating film being associated with at least one sublayer, which is based on silicon nitride or oxynitride or carbonitride, or based on aluminum and/or zirconium nitride or oxynitride or carbonitride, or a mixture of at least two of these compounds (mixed Si—Al or Si—Zr nitrides or oxynitrides or carbonitrides).

14 Claims, No Drawings

GLAZING PROVIDED WITH A STACK OF THIN FILMS ACTING ON THE SUNLIGHT

The present application is the US counterpart of WO2007/028913, the text of which is incorporated by reference and claims the priority of the French application No. 0552387 filed on 29 Jul. 2005, the text of which is incorporated by reference.

The invention relates to glazing provided with thin-film multilayers acting on solar radiation, especially glazing intended for thermal insulation and/or solar protection.

This type of glazing is more particularly suitable for fitting into buildings: by virtue of the thin films, it makes it possible, by varying the amount of solar radiation energy, to prevent the interior of rooms being excessively heated in the summer and thus helps to limit the consumption of energy needed for air-conditioning them.

The invention also relates to this type of glazing once it has been opacified so as to form part of wall-cladding panels, which is called, more concisely, "curtain walling" and which, in combination with window glazing, makes it possible to provide buildings with exterior surfaces that are entirely glazed.

Such multilayer glazing (and curtain walling) is subjected to a number of constraints: with regard to window glazing, the films employed must filter out the solar radiation sufficiently. Furthermore, the thermal performance must preserve the optical and esthetic appearance of the glazing: it is desirable to be able to modulate the level of light transmission of the substrate and to retain an esthetically attractive color, most particularly in external reflection. This is also true of curtain walling with regard to the appearance in reflection. These films must also be sufficiently durable, this being the more so if, in the glazing once fitted, they are on one of the exterior faces of the glazing (as opposed to the "interior" faces turned toward the intermediate gas-filled cavity of a double-glazing unit, for example).

Another constraint is imposed progressively: when the glazing consists at least partly of glass substrates, these may have to undergo one or more heat treatments, for example a bending operation if it is desired to shape them (shop window) or a toughening or annealing operation if it is desired to make them stronger/less hazardous in the event of impacts. The fact that films are deposited on the glass before its heat treatment means that there is a risk of them being damaged and their properties, especially optical properties, being substantially modified (to deposit the films after the glass has been heat-treated is complicated and expensive).

A first approach consists in modifying the optical appearance of the glass due to the films after the heat treatment and in configuring the films so that they have the desired properties, especially optical and thermal properties, only after this treatment. But in fact this means having to manufacture two types of multilayers in parallel, one for non-toughened/non-curved glazing and the other for glazing which will be toughened/curved. It is endeavored henceforth to avoid this by devising multilayers of thin (interferential) films which are able to withstand heat treatments without the optical properties of the glass being modified too significantly and without its appearance being degraded (optical defects). The films may then be referred to as "bendable" or "toughenable" films.

An example of solar-protection glazing for buildings is given in patents EP-0 511 901 and EP-0 678 483: these refer to functional films for filtering out solar radiation that are made of a nickel-chromium alloy, optionally nitrided, made of stainless steel or of tantalum and are placed between two dielectric films of metal oxides such as $SnO_2$, $TiO_2$ or $Ta_2O_5$.

Such glazing makes for good solar-protection glazing with satisfactory mechanical and chemical durability, but is not truly "bendable" or "toughenable" since the oxide films surrounding the functional film do not prevent it from being oxidized during the bending or toughening operation, the oxidation being accompanied by a modification in the light transmission and in the general appearance of the glazing in its entirety.

Many studies have been carried out recently to make the films bendable/toughenable in the context of low-emissivity glazing, in which the aim is rather to achieve high light transmission as opposed to solar protection. It has already been proposed to use, above the silver functional films, dielectric films based on silicon nitride, this material being relatively inert with respect to high-temperature oxidation and proving suitable for preserving the subjacent silver film, as described in patent EP-0 718 250.

Other multilayers acting on solar radiation and assumed to be bendable/toughenable have been described, these employing functional films other than silver: patent EP-0 536 607 uses functional films made of a metal nitride, of the TiN or CrN type, with protective films made of metal or of silicon derivatives; patent EP-0 747 329 describes functional films made of a nickel alloy of the NiCr type that are combined with silicon nitride films.

Multilayer structures are also known that use, as film acting on solar radiation, titanium dioxide ($TiO_2$), this film being pyrolytically deposited in the float chamber, namely by thermally decomposing a liquid or solid precursor of titanium-based precursors.

Although the product is satisfactory from the standpoint of reflection properties with regard to solar radiation, its method of manufacture no longer meets environmental regulations. This is because the pyrolytic deposition technique requires the use of organometallic precursors in hydrocarbon-type solvents, which mean that the waste and gaseous discharges have to undergo further treatment.

Furthermore, the pyrolytic deposition technique requires the use of nozzles placed in the treatment chamber, facing the moving glass ribbon, so as to be able to disperse the organometallic precursors as uniformly as possible for the purpose of obtaining a film with optimum optical properties.

However, these multilayers providing a solar-protection function that are deposited pyrolytically have reached performance levels that are not easily capable of being improved, considering the deposition technique and the regulatory requirements.

The object of the invention is therefore to develop a novel type of thin-film multilayers acting on solar radiation, for the purpose of manufacturing improved solar-protection glazing by a magnetron-sputtering technique. The intended improvement is especially to obtain a better compromise between durability, thermal properties, optical properties and ability to withstand heat treatments without any damage when the substrate carrying the multilayer is of the glass type.

The other object of the invention is to make this multilayer compatible with the use of the glazing, once it has been opacified, as curtain walling.

The subject of the invention is firstly a transparent substrate, especially a glass substrate, provided with a thin-film multilayer acting on solar radiation, the multilayer being deposited by magnetron sputtering, which is characterized in that it includes at least a lubricating film of high optical index n, this lubricating film being associated with at least one sublayer, which is based on silicon nitride or oxynitride or carbonitride, or based on aluminum and/or zirconium nitride or oxynitride or carbonitride, or a mixture of at least two of these compounds (mixed Si—Al or Si—Zr nitrides or oxynitrides or carbonitrides).

The lubricating films of the invention allow the light transmission value of the substrate to be varied within the desired ranges, as explained in detail below, by adjusting their thicknesses, while still maintaining a solar-protection effect.

The presence of the sublayer makes it possible to vary, more flexibly, the optical appearance conferred by the multilayer on its carrier substrate. Furthermore, in the case of heat treatment, it constitutes an additional barrier, especially with respect to oxygen and alkaline metals from the glass substrate, which species are liable to migrate toward the heat and to degrade the multilayer.

Furthermore, the choice of an overlayer based on silicon nitride or silicon oxide (abbreviated to $Si_3N_4$ and $SiO_2$) or on silicon oxynitride (abbreviated to SiON, without prejudicing the respective amounts of Si, O and N) has also proved to be highly advantageous on several counts: this type of material proves to be capable of protecting the films of the multilayer (the lubricating layer and the sublayer) of the invention at high temperature, especially from oxidation, while maintaining their integrity, thereby making the multilayer according to the invention bendable/toughenable when the substrate carrying the multilayer is made of glass and when it is desired for said multilayer to undergo a heat treatment of this type after deposition of the films: the change in optical properties caused by a heat treatment of the toughening type is slight, with the light transmission and external appearance in reflection both being modified sufficiently slightly not to be significantly perceptible to the human eye.

Finally, it has been discovered that it is also compatible with a subsequent enameling treatment, this being most particularly advantageous in the case of curtain walling, since in general there are two possible ways of opacifying the glazing for curtain walling: either a lacquer is deposited on the glass, which is dried and cured with a moderate heat treatment, or an enamel is deposited.

The enamel, like that usually deposited, is composed of a powder containing a glass frit (the glassy matrix) and pigments used as colorants (the frit and the pigments being based on metal oxides), and a medium also called a vehicle, allowing the powder to be applied to the glass and to adhere to it at the time of deposition. To obtain the final enameled coating, it must then be fired, and this firing operation is frequently carried out concomitantly with the operation of toughening/bending the glass. Reference may be made for further details about the enamel compositions to patents FR-2 736 348, WO 96/41773, EP-718 248, EP-712 813 and EP-636 588. The enamel, a mineral coating, is durable, adherent to the glass and therefore a useful opacifying coating. However, when the glazing is provided beforehand with thin films, it is tricky to use it for two reasons:

on the one hand, firing the enamel necessarily means subjecting the multilayer to a high-temperature heat treatment, which is possible only if the multilayer is capable of not being optically degraded during this treatment; and on the other hand, over time the enamel tends to release chemical substances which diffuse into the subjacent films and chemically modify them.

However, using a silicon nitride or oxynitride or silicon oxide film to complete the thin-film multilayers has been very effective both for making the overall multilayer capable of withstanding the heat treatments and for acting as a barrier to these chemical compounds liable to diffuse out of the enamel layer.

Consequently, the multilayer according to the invention is enamelable in the sense that an enamel can be deposited on the face of the substrate that is not coated with the multilayer and fired without appreciably changing the optical appearance, with respect to window glazing provided with the same films, in external reflection. This is precisely the challenge for curtain walling, namely to provide harmony of color and as far as possible similarity of external appearance with the window glazing so as to be able to form entirely glazed walls which are esthetically attractive.

According to another embodiment, not exclusive of the previous one, provision may be made to use multiple sublayers, especially having an alternation of high refractive index (for example between 1.8 and 2.2) and low refractive index (for example between 1.4 and 1.6). These are preferably sequences of the $Si_3N_4$ (index≈2)/$SiO_2$ (index≈1.45) or $Si_3N_4/SiO_2/Si_3N_4$ type. These sequences allow the external appearance of the substrate in reflection to be adjusted, especially for the purpose of reducing the value of $R_L$ and/or its color.

Moreover, the film or films of the multilayer which are based on silicon nitride or oxynitride also contain a metal in a minor amount with respect to silicon, for example aluminum, especially up to 10% by weight of the compound constituting the film in question. This is useful for increasing the rate of deposition of the film by magnetically enhanced reactive sputtering, in which the silicon target without any "doping" with a metal is not conducting enough. The metal may furthermore confer better durability on the nitride or oxynitride.

With regard to the thicknesses of the films described above, it is usual to choose a thickness range from 5 to 50 nm for the lubricating film, especially between 5 and 30 nm. The choice of its thickness allows the light transmission of the substrate to be varied within ranges used for glazing providing buildings with solar protection, i.e. especially 50 to 80% or 60 to 70%. Of course, the light transmission level may also be modified using other parameters, especially the thickness and the composition of the substrate, most particularly when it is made of clear or colored glass.

The thickness of the sublayer is preferably between 5 and 70 nm, especially between 10 and 35 nm. For example, it is 15, 20 or 25 nm.

The thickness of the optional overlayer is preferably between 1 and 10 nm, especially between 2 and 7 nm.

When there is a single sublayer, of the $Si_3N_4$ type, its thickness, is, for example, 5 to 50 nm, especially about 10 to 30 or 25 nm. When it is a sequence of several films, each of the films may have a thickness of, for example, 5 to 50 nm, especially 15 to 45 nm.

The sublayer and/or the overlayer may in fact form part of a superposition of dielectric films. One or other may thus be combined with other films of different refractive indices. Thus, the multilayer may include, between the substrate and the functional film (or above the functional film) an alternation of three, high index/low index/high index, films, the "high index" (at least 1.8 to 2) film or one of them possibly being the sublayer of the invention of the $Si_3N_4$ or AlN type and the "low index" (for example less than 1.7) film possibly being made of silicon oxide $SiO_2$.

The thickness of the additional metal nitride film is preferably between 2 and 20 nm, especially between 5 and 10 nm. It is therefore preferably thin and therefore possibly contributes only very slightly to the solar protection effect imparted by the metal film.

A preferred embodiment of the invention is a multilayer that includes a lubricating film based on titanium dioxide ($TiO_2$) or zirconium dioxide ($ZrO_2$) or a mixture of titanium oxide and zinc oxide (OTiZn) or a mixed silicon zirconium nitride (SiZrN), a sublayer based on silicon nitride and an optional overlayer, also based on silicon nitride ($Si_4N_4$) or silicon oxide (SiO).

The subject of the invention is also a substrate provided with the multilayer which is described above, in general, and is bendable and/or toughenable and/or enamelable. A multilayer which is "bendable and/or toughenable" is understood within the meaning of the invention to be a multilayer which, deposited on the substrate, undergoes a limited optical change and may especially be quantified within the (L*,a*,b*) colorimetry system by a ΔE* value of less than 3, especially less than 2.

ΔE* is defined as follows: $\Delta E^* = (\Delta L^{*2} + \Delta a^{*2} + \Delta b^{*2})^{1/2}$, where ΔL*, Δa* and Δb* are the differences in the L*, a* and b* measurements before and after heat treatment.

That face of the substrate not provided with a multilayer is considered as "enamelable" when it is possible to deposit on it, in a known manner, an enamel composition without the appearance of optical defects in the multilayer (which is on the other face of the substrate) and with a limited optical change, which may be quantified as above. This also means that it has a satisfactory durability, without any undesirable deterioration of the films of the multilayer in contact with the enamel, either while it is being fired or over time once the glazing has been fitted.

Of course, a multilayer of this type is advantageous when substrates made of clear or bulk-tinted glass are used. However, it is possible just as well not to seek to exploit its bendable/toughenable nature but simply its satisfactory durability, by using glass substrates but also substrates not made of glass, especially made of a rigid and transparent polymer material such as polycarbonate or polymethyl methacrylate (PMMA) substituting for the glass, or else a flexible polymer material, like certain polyurethanes or like polyethylene terephthalate (PET), which flexible material can then be fastened to a rigid substrate in order to functionalize it, by making them adhere by various means, or by a lamination operation.

The subject of the invention is also "monolithic" glazing (i.e. glazing comprising a single substrate) or insulating multiple glazing of the double-glazing type. Preferably, whether monolithic glazing or double glazing, the multilayers are placed on the 2 face (conventionally, the glass/substrate faces of a glazing assembly are numbered from the outside toward the inside of the compartment/room which is fitted therewith) and provide a solar-radiation protection effect.

More particularly, advantageous glazing according to the invention has a $T_L$ of about 50 to 80%, especially 60 to 70%, and a solar factor SF close to the $T_L$ value. It also has preferably a blue or green color in external reflection (on that side of the substrate which is not provided with films) especially with, in the (L*,a*,b*) colorimetry system, negative a* and b* values (before and after any possible heat treatment). Thus, an attractive and not very strong color in reflection, desirable in buildings, is obtained.

The subject of the invention is also a substrate with a multilayer and partially opacified by a coating of the lacquer or enamel type, for the purpose of making curtain walling, in which the opacifying coating is in direct contact with the face of the substrate that is not coated with the multilayer. The multilayer can therefore be absolutely identical both for window glazing and for curtain walling.

Although the application more particularly intended by the invention is glazing for buildings, it is clear that other applications can be envisaged, especially for vehicle windows (apart from windshields, in which a very high light transmission is required), such as the side windows, sunroof and rear window.

The invention will be described below in greater detail with the aid of nonlimiting examples.

All the substrates are made of 6 mm-thick clear glass of the PLANILUX type sold by Saint-Gobain Glass France.

All the films are deposited in a known manner by magnetically enhanced sputtering, the metal films using a metal target in an oxidizing atmosphere in the case of $TiO_2$, the metal nitride or silicon nitride films using a suitable metal or silicon (bulk-doped with 8% aluminum) target in a reactive atmosphere containing nitrogen (100% $N_2$ for TiN and 40% Ar/60% $N_2$ for $Si_3N_4$). The $Si_3N_4$ films therefore contain a little aluminum.

EXAMPLE 1

This example uses a $TiO_2$ lubricating film and an $Si_3N_4$ sublayer according to the following sequence:

glass/$Si_3N_4$(25 nm)/$TiO_2$(20 nm).

After depositing the films, the substrate underwent the following heat treatment: 620° C. heating for 10 minutes.

EXAMPLE 2

This example uses the same lubricating film and the same sublayer as in Example 1, with an additional $SiO_2$ overlayer according to the following sequence:

glass/$Si_3N_4$(20 nm)/$TiO_2$(20 nm)/$SiO_2$(5 nm).

The coated substrate then underwent the same heat treatment as in Example 1.

Table 1 below combines, for Examples 1, 2, the following properties:

optical transmission $T_L$: light transmission in % under illuminant $D_{65}$;

external reflection (i.e. that measured on the external side when the coated glass is fitted as monolithic glazing in a room with the multilayer on face 2: external reflection ($R_{LEXT}$) in %; $a^*_{(REXT)}$, $b^*_{(REXT)}$, the colorimetric coordinates in external reflection according to the (L*,a*,b*) colorimetry system;

internal reflection: the value of $R_{LINT}$ in % and the calorimetric data $a^*_{(RINT)}$, $b^*_{(RINT)}$; and energy transmission: $T_E$ in %.

All these properties are given twice: once before heat treatment and once after heat treatment. Also measured are $\Delta E^*_{(T)}$ in transmission, $\Delta E^*_{(REXT)}$ in external reflection and $\Delta E^*_{(RINT)}$ in internal reflection, where $\Delta E^* = (\Delta L^{*2} + \Delta a^{*2} + \Delta b^{*2})^{1/2}$ for transmission, with:

$\Delta a^* = a^*(\text{after treatment}) - a^*(\text{before treatment})$;

$\Delta b^* = b^*(\text{after treatment}) - b^*(\text{before treatment})$;

$\Delta L^* = L^*(\text{after treatment}) - L^*(\text{before treatment})$.

TABLE 1

| EXAMPLE | Heat treatment | TRANSMISSION | | | EXTERNAL REFLECTION | | | | INTERNAL REFLECTION | | | |
|---|---|---|---|---|---|---|---|---|---|---|---|---|
| | | $T_L$ | $A^*_{(REXT)}$ | $b^*_{(REXT)}$ | $R_{LEXT}$ | $L^*$ | $a^*$ | $b^*$ | $R_{LINT}$ | $L^*$ | $a^*_{(RINT)}$ | $b^*_{(RINT)}$ |
| Example 1 | Before | 66.7 | −1.2 | 5.7 | 31.4 | 62.9 | −1.4 | −9.1 | 29.8 | 61.5 | −3.3 | −8.6 |
| | After | 65.6 | −1 | 6.3 | 32.3 | 63.6 | −1.3 | −9.9 | 30.7 | 62.3 | −3.2 | −9.4 |
| | ΔE* | | 1.2 | | | 1.2 | | | | 1.2 | | |
| Example 2 | Before | 68.8 | −0.4 | 4.4 | 29.0 | 60.8 | −2.3 | −7.4 | 30.0 | 61.7 | −1.3 | −7.5 |
| | After | 67.6 | −0.3 | 5.2 | 30.1 | 61.7 | −2.1 | −8.1 | 31.1 | 62.6 | −1.1 | −8.2 |
| | ΔE* | | 1.0 | | | 1.2 | | | | 1.2 | | |

This table shows that Examples 1 and 2 according to the invention provide a good ΔE* before heat treatment/ΔE* after heat treatment compromise (little variation) and they provide good solar protection. They are also good from the point of view of esthetic appearance, most particularly in external reflection where the a* and b* values are negative giving a color in the blue-green that is not very strong, regarded as attractive for glazing with strong external reflection.

What is notable is that all these advantages are retained after heat treatment: the $T_L$ and $T_E$ values are retained to within 1%, the calorimetric data change very little and there is no switch from one color to another in external reflection. There are no optical defects. The ΔE* value, quantifying a possible colorimetric change, remains at most 1.2 in transmission, in internal reflection and in external reflection: this is indeed a multilayer capable of undergoing a treatment of the bending or toughening type without significant degradation. Whether it is desired to have a glass which may or may not be toughened, annealed or curved, the invention provides a solar-protection multilayer with identical, retained, properties. The comments made with regard to Example 1 also apply to Example 2, except as regards the value of ΔE* in transmission, which is substantially less than the corresponding value in both internal and external reflection.

In conclusion, the solar-protection glazing according to the invention is highly advantageous for fitting into buildings, but not to the exclusion of applications in automobiles and any other vehicle: side windows, rear window and sunroof, which may also have enameled coatings. With a fixed multilayer, especially with the desired $T_L$ and $T_E$ values, it is thus possible, without having to modify the multilayer, to manufacture window glazing which is not intended to undergo heat treatments or which must be bent/toughened/annealed and to manufacture curtain walling in complete colorimetric harmony with the window glazing, which may be lacquered or enameled: it is thus possible to standardize the manufacture of interferential films on large-sized substrates, this being a great advantage from the industrial standpoint.

The invention has resulted in the development of toughenable solar-control glazing with ΔE* values in external reflection of 1.2 or less.

It is also possible to make enameled, rather than lacquered, multilayer-coated curtain walling, this also being highly advantageous from an industrial standpoint (the enameling taking place during the toughening process, whereas lacquering requires an additional manufacturing step).

The invention claimed is:
1. A composite structure, comprising:
 a transparent substrate; and
 a multi-layer thin film;
 wherein:
 the multi-layer thin film consists of:
  a silicon nitride sublayer having a thickness of from 5 to 70 nm;
  a titanium dioxide lubricating film having a thickness of from 5 to 50 nm; and
  a silicon dioxide overlayer having a thickness of from 1 to 10 nm;
 a surface of the silicon nitride sublayer is in contact with a surface of the transparent substrate;
 the silicon nitride sublayer, the titanium dioxide lubricating film, and silicon dioxide overlayer are formed by magnetron sputtering; and
 the multi-layer thin film is capable of filtering solar radiation.
2. The composite structure of claim 1, wherein the multi-layer film is bendable/toughenable and/or enamelable.
3. The composite structure of claim 1, wherein the transparent substrate comprises glass.
4. A monolithic or double glazing, comprising the composite structure of claim 1, wherein:
 the multi-layer thin film is provided on a surface of the transparent substrate facing toward an interior of a compartment or room when the glazing is installed at an exterior of the compartment or room.
5. The glazing of claim 4, wherein the glazing has a light transmission $T_L$ of from 50 to 80%.
6. The glazing of claim 4, wherein the glazing exhibits a blue or green color in external reflection.
7. The glazing of claim 4, wherein the glazing has a light transmission $T_L$ of from 60 to 75%.
8. The glazing of claim 4, wherein the glazing exhibits a color having negative a* and b* values in external reflection.
9. The composite structure of claim 1, further comprising an opaque coating, wherein:
 the opaque coating is in the form of a lacquer or an enamel.
10. A curtain walling-type wall cladding panel, comprising the composite structure of claim 9.
11. The composite structure of claim 1, wherein the silicon nitride sublayer has a thickness of from 10 to 35 nm.
12. The composite structure of claim 1, wherein the titanium dioxide lubricating film has a thickness of from 5 to 30 nm.
13. The composite structure of claim 1, wherein the silicon dioxide overlayer has a thickness of from 2 to 7 nm.
14. The composite structure of claim 1, wherein the transparent substrate comprises a polymer material.

* * * * *